(12) United States Patent
Shawver et al.

(10) Patent No.: US 7,739,283 B2
(45) Date of Patent: *Jun. 15, 2010

(54) SYSTEM AND METHOD FOR USING AN RMI ACTIVATION SYSTEM DAEMON WITH NON-JAVA APPLICATIONS

(75) Inventors: Matthew A. Shawver, Kaneohe, HI (US); Jos Martin, Burwell (GB)

(73) Assignee: The MathWorks, Inc., Natick, MA (US)

( * ) Notice: Subject to any disclaimer, the term of this patent is extended or adjusted under 35 U.S.C. 154(b) by 330 days.

This patent is subject to a terminal disclaimer.

(21) Appl. No.: 11/842,010

(22) Filed: Aug. 20, 2007

(65) Prior Publication Data
US 2008/0046899 A1 Feb. 21, 2008

Related U.S. Application Data

(63) Continuation of application No. 11/102,090, filed on Apr. 8, 2005.

(51) Int. Cl.
G06F 3/00 (2006.01)
G06F 7/00 (2006.01)
G06F 9/44 (2006.01)
G06F 9/46 (2006.01)
G06F 13/00 (2006.01)
G06F 17/30 (2006.01)

(52) U.S. Cl. .......................... 707/736; 707/806; 717/114; 719/330

(58) Field of Classification Search .............. 707/104.1; 717/114; 719/330
See application file for complete search history.

(56) References Cited

U.S. PATENT DOCUMENTS

| 6,185,609 | B1 | 2/2001 | Rangarajan et al. |
| 6,947,949 | B2 * | 9/2005 | Fujisawa ................ 707/103 R |
| 6,999,607 | B2 | 2/2006 | Kiros et al. |
| 7,158,973 | B2 | 1/2007 | Mandal et al. |
| 7,415,704 | B2 * | 8/2008 | Schmidt et al. ............. 717/166 |

(Continued)

OTHER PUBLICATIONS

Sun Microsystems, Inc., Java (TM) Remote Method Invocation Specification, 2003, Revision 1.9, pp. 1-120.*

(Continued)

*Primary Examiner*—James Trujillo
*Assistant Examiner*—Jorge A Casanova
(74) *Attorney, Agent, or Firm*—Lahive & Cockfield, LLP; Kevin J. Canning

(57) ABSTRACT

A system and a method for implementing the system are provided. The system may include a non-Java-based application to communicate in a remote session, via a network including a plurality of remote method invocation (RMI) services, to a Java-based application using RMI; a configuration file including a reference to the non-Java based application; an RMI registry to register a set of the RMI services and the non-Java-based application using the configuration file; and an RMI activation system daemon to manage the non-Java-based application in the remote session.

9 Claims, 4 Drawing Sheets

U.S. PATENT DOCUMENTS

| | | | |
|---|---|---|---|
| 7,437,740 B1 | 10/2008 | Koerber et al. | |
| 7,444,619 B2 | 10/2008 | McManus | |
| 2002/0161996 A1* | 10/2002 | Koved et al. | 713/150 |
| 2004/0019596 A1* | 1/2004 | Taylor et al. | 707/100 |

OTHER PUBLICATIONS

Gong, Li, Java (TM) Security Architecture (JDK 1.2), 1997-1998, Version 1.0, pp. 1-70.*

Chiang, Chia-Chu, "Wrapping legacy systems for use in heterogeneous computing environments," *Information and Software Technology*, vol. 43:497-507 (2001).

Doyle, Edward, "Cobra Wrap Interface," ACM Southeast Regional Conference, Proceedings of the 37th annual Southeast regional conference. (1999).

Husbands, Parry Jones Reginald, "Interactive Supercomputing," pp. 1-96 (1999).

"Java Remote Method Invocation—Distributed Computing for Java," White Paper retrieved online at: http://web.archive.org/web/20040427111947/http://java.sun.com/products/jdk/rmi/reference/whitepapers/javarmi.html (2006).

"Java Remove Method Invocation," Java Remove Method Invocation Specification, (1998).

Newmarch, Jan et al., "A Service Architecture for Scalable Distributed Audio," retrieved online at http://jan.newmarch.name/publications/scalable_audio.pdf (2004).

International Search Report for Application No. PCT/US2006/013676, dated Apr. 8, 2005.

\* cited by examiner

SYSTEM AND METHOD FOR USING AN RMI ACTIVATION SYSTEM DAEMON WITH NON-JAVA APPLICATIONS

RELATED APPLICATION

This application is a continuation of U.S. patent application Ser. No. 11/102,090, entitled "SYSTEM AND METHOD FOR USING AN RMI ACTIVATION SYSTEM DAEMON WITH NON-JAVA APPLICATIONS," filed Apr. 8, 2005, the entire disclosure of which is incorporated herein by reference.

FIELD OF THE INVENTION

The illustrative embodiment of the present invention relates generally to the use of RMI (Remote Method Invocation) and more particularly to the registration and use of a non-Java application with an RMI activation system daemon.

BACKGROUND

RMI is a set of protocols developed by Sun Microsystems, Inc. of Palo Alto, Calif. which enable Java objects (based on the Java programming language developed by Sun Microsystems, Inc.) to communicate remotely. The use of RMI allows for distributed computing in which the processing being performed by an application may be divided between a client and one or more servers. The RMI services being invoked are managed by an RMI activation system daemon such as RMID or Phoenix. RMID is the RMI activation system daemon from Sun Microsystems, Inc. (started by the 'rmid' command) that allows objects to be registered and activated in a Java Virtual Machine (JVM). Phoenix is a distributed network framework developed by Intel Corporation of Santa Clara, Calif. that is backwards compatible with RMID and may be used to support the RMI service framework discussed herein. The RMI activation system daemon provides persistence to the RMI services by managing the process in which the RMI service runs. In the event of session failure, the RMI activation system daemon is able to reinitiate the RMI service to limit any interruption in service being provided to the client.

Unfortunately, the RMI activation system daemon uses a number of mechanisms which are Java-based. While this allows the RMI services being managed by the RMI activation system daemon to communicate with each other using well-understood Java mechanisms, the use of the Java mechanisms presents a problem in integration with non-Java applications. Conventionally, there is not an available mechanism by which non-Java applications may be integrated into a service framework such that it can be managed by the RMI activation system daemon.

BRIEF SUMMARY

According to one aspect a method of enabling a non-Java-based application to communicate within a remote method invocation (RMI) framework may include configuring the non-Java-based application, providing a configuration file including a reference to the non-Java-based application; and registering, using the configuration file, the non-Java-based application in an RMI registry associated with the RMI framework. The configuring the non-Java-based application may include initiate, using an application programming interface (API), a Java virtual machine (JVM) upon startup of the non-Java-based application, disabling reading from standard input (STDIN) as direct input, and locating classes of the non-Java application on a classpath of the JVM.

According to another aspect, a system may include a non-Java-based application configured to communicate in a remote session, via a network including a plurality of remote method invocation (RMI) services, to a Java-based application using RMI; a configuration file including a reference to the non-Java based application; an RMI registry to register a set of the RMI services and the non-Java-based application using the configuration file; and an RMI activation system daemon to manage the non-Java-based application in the remote session.

According to another aspect, a device readable medium holding device readable instructions for altering a non-Java-based application to enable management of a remote session with a Java-based application by a remote method invocation (RMI) activation system daemon, includes instructions to forward an RMI call received via the RMI activation system daemon and read from standard input (STDIN) to a Java native interface (JNI) associated with the non-Java-based application; instructions to initiate, using the JNI, a Java virtual machine (JVM) upon startup of the non-Java-based application; and instructions to locate all classes of the non-Java application on a classpath of the JVM.

DETAILED DESCRIPTION

The illustrative embodiment of the present invention allows non-Java applications to mimic a Java application so as to be managed by an RMI activation system daemon. Once registered the non-Java application is able to be integrated with Java applications. The use of the RMI activation system daemon also provides a well-understood mechanism to increase the persistence and reliability of the non-Java application during distributed computing and parallel computing tasks.

Figure 1:
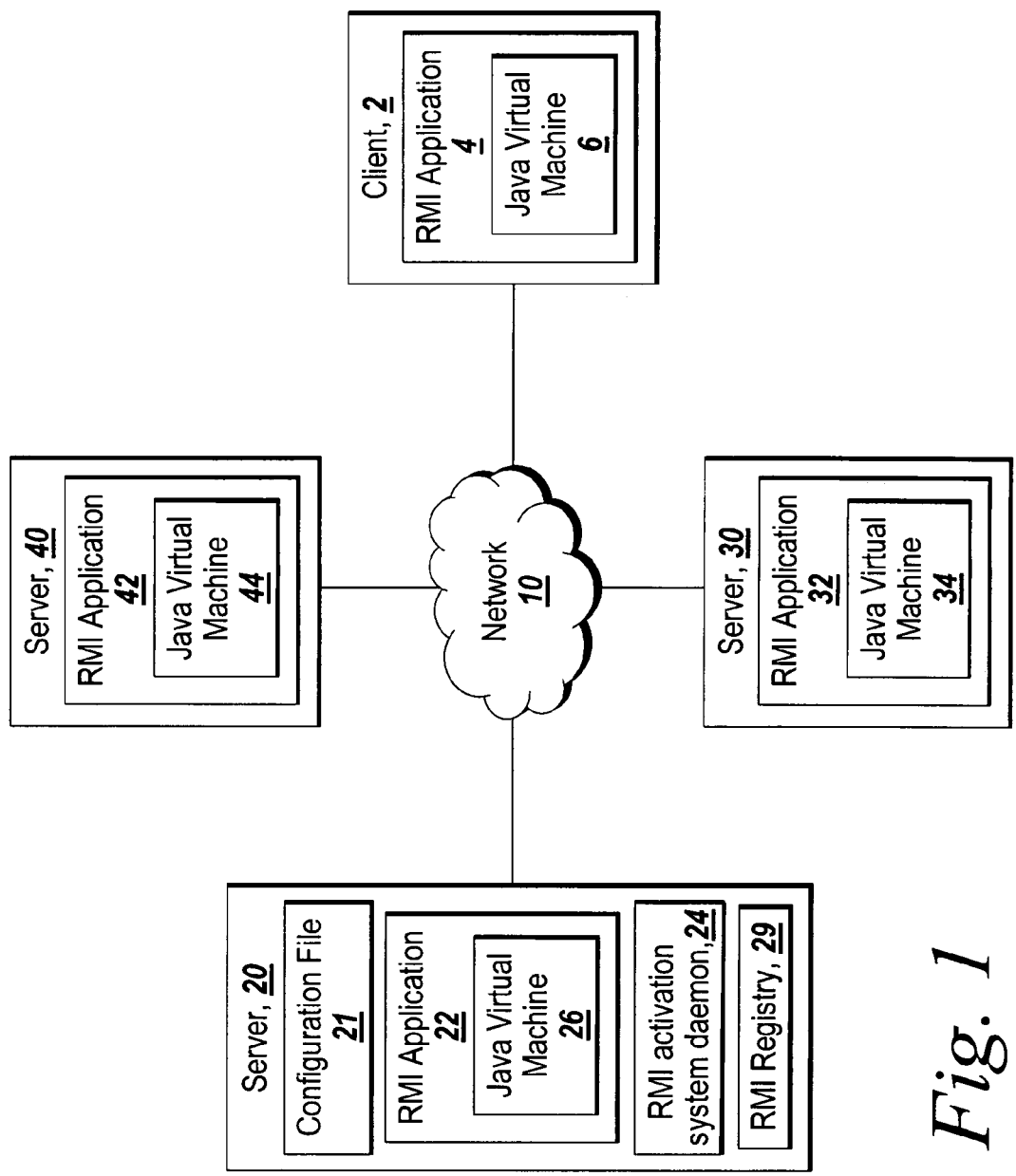
FIG. 1 depicts a conventional distributed computing environment utilizing RMI services and managed by an RMI activation system daemon.

FIG. 1 depicts a conventional homogenous RMI service environment. A client 2 communicates over a network 10 with servers 20, 30 and 40. The client 2 includes an RMI application 4 and a JVM 6 utilized by the RMI application to communicate with an RMI application 22 located on server 20. Server 20 also includes a configuration file 21 and a JVM 26 generated by RMI application 22. Server 20 additionally includes an RMI activation system daemon 24 and an RMI registry 29. In a conventional environment, the RMI activation system daemon processes information from the configuration file 21 and identifies an RMI application 22 to be executed. The RMI activation system daemon 24 proceeds through the conventional start-up sequence for the RMI application 22 and registers the RMI application in the RMI registry 29. The conventional RMI start-up sequence is discussed in detail below. The RMI application 22 communicates over the network 10 with the client portion of the RMI application 4 located on the client 2. The RMI application 22 may not be located entirely on server 20 but rather may be segmented and distributed as RMI application 32 and RMI application 42 located on servers 30 and 40 respectively. The RMI activation system daemon 24 may manage parallel computing tasks being performed by RMI applications 22, 32, and 42. Each RMI application 22, 32 and 42 generates a JVM 26, 34, and 44 which is used to communicate with the other server hosted Java applications and with RMI application 4 located on the client 2.

The RMI activation system daemon 24 manages the distributed and/or parallel computing being performed by the RMI application 4, 24, 32, and 42. In the event of service interruption, the RMI activation system daemon 24 is responsible for re-initiating the interrupted RMI application 4, 22, 32, or 42. The ability of the RMI activation 24 to re-activate an interrupted RMI application 4, 22, 32, 42 provides persistence and reliability to the RMI execution environment. The RMI communication methods used by the RMI applications 22, 32, 42, and 4 are all Java-based. The Java-based methods present an obstacle to the integration of non-Java applications into the RMI service framework.

Figure 2:
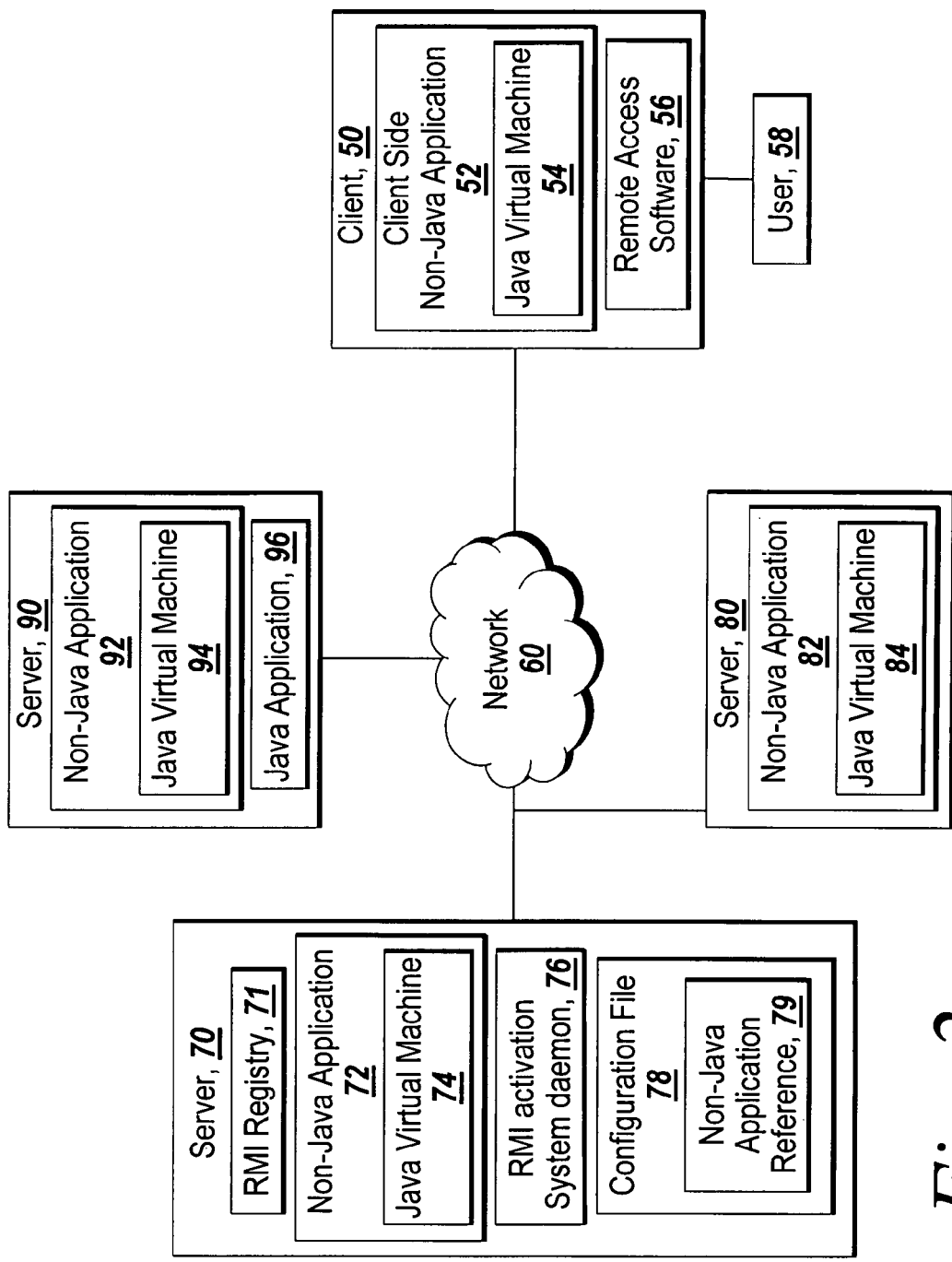
FIG. 2 depicts an environment suitable for practicing the illustrative embodiment of the present invention.

The illustrative embodiment of the present invention addresses the obstacles posed by the reliance on Java in the RMI service framework. FIG. 2 depicts an environment suitable for practicing the illustrative embodiment of the present invention to integrate a non-Java application into the RMI service framework. A user 58 accesses a client 50 communicating over a network 60. The network 60 may be a Local Area Network (LAN), a Wide Area Network (WAN) an intranet, an internet, the Internet, or some other type of network. A client 50 will include the client side of a non-Java application 52. As will be explained further below, the non-Java application in the present invention generates a JVM for RMI communication with the RMI activation system daemon and other Java applications. Alternatively, the client 50 may hold remote access software 56 enabling the user 58 to log onto a session running on a remote server 70, 80 and 90 and access a non-Java application located on one of those servers practicing the illustrative embodiment of the present invention. Although the terms client and server have been utilized herein to identify the devices communicating over the network 60, those skilled in the art will recognize that a multitude of different electronic devices equipped with processors may be utilized in the present invention. Thus, the client and servers may include laptops, work stations, stand alone servers, blade servers, mainframe computers, PDAs, and other network devices capable of performing the operations described herein. The client side non-Java application 52 communicates over the network 60 whereas a one or more server 70, 80, and 90.

Similarly, those skilled in the art will recognize that many different network architectures are possible within the scope of the present invention. For example, the servers 70, 80 and 90 might all be arranged in a server farm connected to Wide Area Network. Alternatively, the servers 70, 80 and 90 may all be located on different local area networks.

The server 70 includes a non-Java application 72 configured in a manner consistent with the present invention described herein. The non-Java application may be a C/C++-based application such as MATLAB from the MathWorks, Inc. of Natick, Mass. Alternatively, those skilled in the art will recognize that the non-Java application 72 may be an application other than MATLAB written in C, C++ or some other programming language other than Java without departing from the scope of the present invention.

The non-Java application 72 generates a JVM 74 utilized by the non-Java application to communicate in the RMI service framework. The server 70 also includes an RMI registry 71, an RMI activation system daemon 76 and an altered configuration file 78 which includes a reference 79 to the non-Java application. The alteration of the configuration file 78 for the practicing of the illustrative embodiment of the present invention is discussed further below. The non-Java application 72 may be segmented in a manner to allow parallel computing tasks to be performed. Accordingly, the server 80 may include non-Java application 82 generating JVM 84, and server 90 may include non-Java application 92 generating JVM 94. Server 90 may also include Java application 96. The illustrative embodiment of the present invention enables the non-Java application 72 to communicate using RMI with the Java application 96. Those skilled in the art will recognize that there may be more than one Java application 96 communicating over the network 60 with which the non-Java application 72 may communicate.

Figure 3:
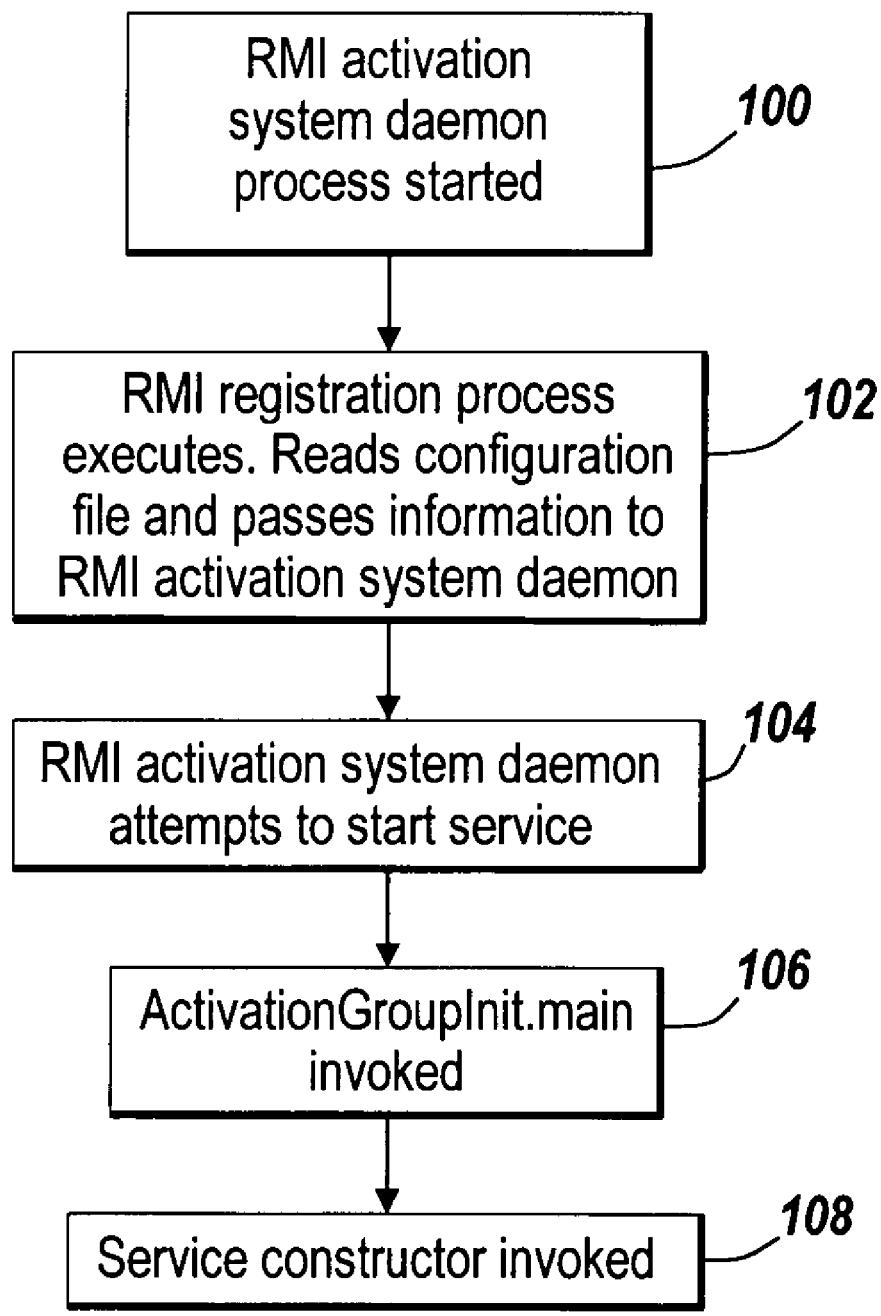
FIG. 3 is a flow chart of the sequence of steps followed by a conventional RMI flow chart environment.

Prior to discussing the alterations in the conventional RMI framework performed by the present invention, it may be helpful to discuss the process ordinarily engaged in by the RMI activation system daemon in a conventional system. The conventional sequence of RMI registration events is outlined in the flow chart of FIG. 3. The sequence begins with the activation of the RMI activation system daemon, typically by the system administrator (step 100). The RMI registration process then executes by processing the information in the configuration file (step 102). The RMI registration process includes multiple steps in which a Java process reads from a registration file and registers selected information. The information read by the Java process and subsequently passed to the RMI activation system daemon includes the location of the Java executable or application that is to be started. The selected information also includes the Java options that should be passed to the Java executable. Additionally, the RMI registration process identifies the classpath that needs to be passed to the Java executable as well as the service class that should be started.

The sequence continues with the RMI activation system daemon attempting to start the service that was identified in the configuration file (step 104). The RMI activation system daemon then invokes ActivationGroupInit.main (step 106). ActiviationGroupInit.main starts the virtual machine executing an activation group. The invoking of ActivationGroupInit.main reads the activation group ID and the activation group description from STDIN (the designated input path). The group ID identifies the process that is being started and the group description gets information from the activation process describing which service class should be started. The invoking of ActivationGroupInit.main also invokes the constructor of the class that is given in the group description. The RMI activation system daemon then invokes the identified service constructor which was previously identified (step 108). The invoking of the service constructor if successful completes the activation sequence. If the service process should happen to execute unexpectedly, the RMI activation system daemon re-initiates the sequence of steps with the reading of the configuration file in order to provide uninterrupted service.

Figure 4:
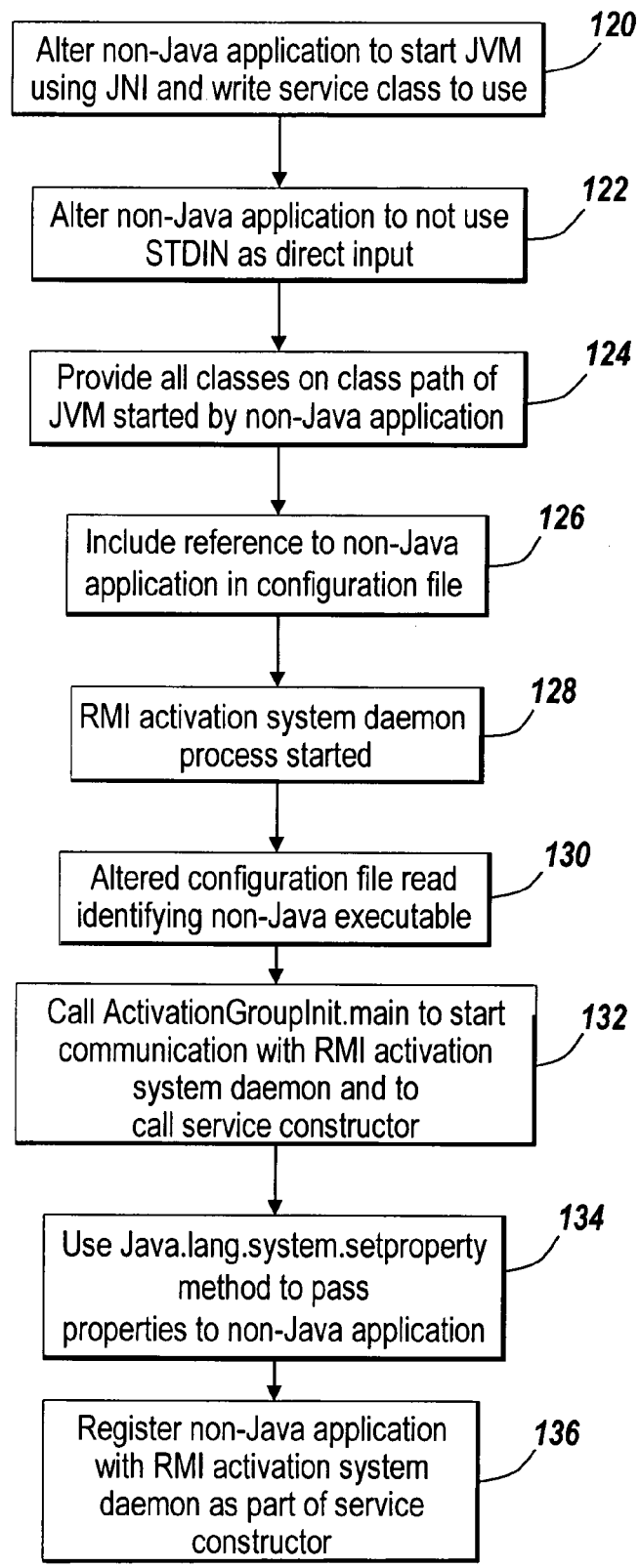
FIG. 4 is a flow chart of the sequence of steps followed by the illustrative embodiment of the present invention to integrate a non-Java application into an RMI service framework.

In order to integrate non-Java applications into this Java-based service framework, a number of changes to the conventional RMI framework are required. FIG. 4 depicts the sequence of steps necessary to alter the traditional RMI service mechanisms to enable a non-Java application to be integrated with the RMI service framework. The sequence of steps begins with the alteration of the non-Java application 72 so that a JVM will be automatically initiated inside the non-Java application during start up using JNI (Java Native Interface) (step 120). A JNI is an API that allows developers to access the languages of a host system and determine the way Java integrates with native code. The non-Java application 72 is also altered so that it does not automatically read from STDIN as direct input (step 122). The RMI activation system daemon will attempt to send Java commands to STDIN. If the non-Java application does not disable reading from STDIN, the Java-formatted commands received by the non-Java application will cause errors. An additional alteration requires that all the classes required by the non-Java application be located on the classpath of the Java machine being initiated by the non-Java application (step 124). This step is necessitated by the fact that many non-Java applications do not accept a-classpath command line flag as an input parameter. The sequence then alters the configuration file by including a reference 79 to the non-Java application 72 rather than a reference to a java executable (step 126).

The sequence of steps followed by the illustrative embodiment of the present invention continues with the normal RMI activation system daemon process being started by a system administrator or other authorized user (step 128) and the altered configuration file being read to identify the non-Java executable (step 130). As part of the non-Java application start up sequence, ActivationGroupInit.main is called to start communication with the RMI activation system daemon and call the necessary service constructor (step 132). The properties passed to STDIN such as the codebase property, security manager property, etc. are read from STDIN but then passed to the Java.lang.System.setProperty method rather than the non-Java application (step 134). The service constructor for the non-Java application then registers the non-Java application with the RMI activation system daemon as part of the call to the service constructor (step 136). As a result, the non-Java application is registered in the RMI registry 71. The JVM generated by the non-Java application is then used to communicate with the other RMI services registered by the RMI activation system daemon.

As previously noted, all RMI calls are delegated to the non-Java application via the JNI associated with the non-Java application. Because the non-Java application has registered with the RMI activation system daemon, the RMI activation system daemon is able to provide a degree of persistence. It enables the non-Java application utilizing the illustrative embodiment of the present invention to perform more robust parallel computing tasks and perform distributed computing with a higher degree of confidence and reliability for the user.

In one aspect of the present invention, the illustrative embodiment of the present invention may be used to control communications for processes performing distributed technical computing such as that performed by MATLAB utilizing the DISTRIBUTED COMPUTING TOOLBOX both from the MathWorks, Inc. of Natick, Mass. In distributed computing, technical computing tasks are distributed from a technical computing client to remote technical computing workers for execution of the tasks on multiple computer systems. Tasks can be declared on a technical computing client and additionally organized into jobs. A job is a logical unit of activities, or tasks that are processed and/or managed collectively. A task defines a technical computing command, such as a MATLAB command, to be executed, and the number of arguments and any input data to the arguments. A job is a group of one or more tasks. The task can be directly distributed by the technical computing client to one or more technical computing workers. A technical computing worker performs technical computing on a task and may return a result to the technical computing client.

Additionally in distributed computing, a task or a group of tasks, in a job, can be submitted to an automatic task distribution mechanism to distribute the one or more tasks automatically to one or more technical computing workers providing technical computing services. The technical computing client does not need to specify or have knowledge of the technical computing workers in order for the task to be distributed to and computed by a technical computing worker. The automatic task distribution mechanism can distribute tasks to technical computing workers that are anonymous to any technical computing clients. The technical computing workers perform the task and may return as a result the output data generated from the execution of the task. The result may be returned to the automatic task distribution mechanism, which, in turn, may provide the result to the technical computing client. The RMI activation system daemon may be used to initiate the job manager which distributes and monitors the distributed tasks.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. A method of enabling a non-native application to communicate within a remote invocation service, the method comprising:
   configuring, using a processor, the non-native application to:
      initiate, using an application programming interface (API), a virtual machine (VM) upon startup of the non-native application,
      disable reading from standard input (STDIN) as direct input, and
      locate classes, on a classpath of the VM, the classes to be used by the non-native application;
   providing, using the processor, a configuration file including a reference to the non-native application; and
   registering, using the processor and the configuration file, the non-native application in a registry associated with the remote invocation service.

2. The method of claim 1, wherein the registering the non-native application comprises:
   activating an activation system daemon associated with the non-native application,
   reading the configuration file to identify the non-native application,
   starting the VM to execute an activation group identifying a service constructor of a class, and
   invoking the service constructor.

3. The method of claim 2, wherein the invoking the service constructor comprises calling the service constructor that includes the activation system daemon.

4. The method of claim 1, wherein the initiation of the VM comprises delegating incoming calls to the non-native application using the API.

5. A system comprising:
   a memory to store:
      a non-native application configured to communicate in a remote session, via a network including a plurality of remote invocation services, to a native application,
      a configuration file including a reference to the non-native application;

an registry to register a set of the remote invocation services and the non-native application using the configuration file, and an activation system daemon to manage the non-Java-based application in the remote session; and a processor coupled to the memory, the processor to:

execute the activation system daemon to manage the non-Java-based application in the remote session, and disable reading from standard input (STDIN) as direct input for the non-native application.

6. The system of claim 5, wherein the remote session includes performance of at least one of parallel computing tasks or distributed computing related to the remote invocation services.

7. The system of claim 5, wherein the non-native application is further configured to not directly receive native-formatted commands from the activation system daemon.

8. The system of claim 5, wherein the activation system daemon is configured to generate an application programming interface (API) to execute an activation group identifying a service class associated with the remote session.

9. The system of claim 8, wherein the activation system daemon is further configured to invoke a service constructor based on the service class.

* * * * *